US009704443B2

(12) United States Patent
Yamakawa

(10) Patent No.: US 9,704,443 B2
(45) Date of Patent: Jul. 11, 2017

(54) LIQUID CRYSTAL DISPLAY APPARATUS AND DISPLAY METHOD

(71) Applicant: Sakai Display Products Corporation, Sakai-shi, Osaka (JP)

(72) Inventor: Ryo Yamakawa, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/305,308

(22) PCT Filed: Jun. 4, 2014

(86) PCT No.: PCT/JP2014/064871
§ 371 (c)(1),
(2) Date: Oct. 19, 2016

(87) PCT Pub. No.: WO2015/186212
PCT Pub. Date: Dec. 10, 2015

(65) Prior Publication Data
US 2017/0039962 A1    Feb. 9, 2017

(51) Int. Cl.
*G09G 3/36* (2006.01)
*G02F 1/133* (2006.01)
*G09G 3/20* (2006.01)

(52) U.S. Cl.
CPC ............ *G09G 3/36* (2013.01); *G02F 1/133* (2013.01); *G09G 3/20* (2013.01);
(Continued)

(58) Field of Classification Search
CPC .... G09G 3/36; G09G 3/20; G09G 2320/0646; G09G 2320/045; G09G 2320/0276;
(Continued)

(56) References Cited

U.S. PATENT DOCUMENTS

2002/0024481 A1* 2/2002 Kawabe ............... G09G 3/3611
345/87
2002/0175907 A1* 11/2002 Sekiya ................. G09G 3/3611
345/211

(Continued)

FOREIGN PATENT DOCUMENTS

JP    H8-140021 A    5/1996
JP    2002-512386 A    4/2002

(Continued)

*Primary Examiner* — Ibrahim Khan
(74) *Attorney, Agent, or Firm* — Bret E. Field; Bozicevic, Field & Francis LLP

(57) ABSTRACT

The liquid crystal display apparatus include a control unit controlling so that a first difference is smaller than a second difference, which the first difference is a difference between an intermediate value between any high gradation value and low gradation value and a gradation value in which a gradation value during a transition from the high gradation value to the low gradation value is equal to a gradation value during a transition from the low gradation value to the high gradation value, when a frame of the converted image is switched, and the second difference is a difference between the intermediate value between the high gradation value and the low gradation value and the gradation value in which the gradation value during the transition from the high gradation value to the low gradation value is equal to the gradation value during the transition from the low gradation value to the high gradation value, when the frame of the acquired image is switched.

8 Claims, 14 Drawing Sheets

(52) U.S. Cl.
CPC . *G09G 2310/0224* (2013.01); *G09G 2310/06* (2013.01); *G09G 2310/08* (2013.01); *G09G 2320/0233* (2013.01); *G09G 2320/0247* (2013.01); *G09G 2320/0252* (2013.01); *G09G 2320/0261* (2013.01); *G09G 2320/0276* (2013.01); *G09G 2320/045* (2013.01); *G09G 2320/0646* (2013.01); *G09G 2340/0435* (2013.01)

(58) Field of Classification Search
CPC ... G09G 2320/0247; G09G 2320/0261; G09G 2340/0435; G09G 2320/0233; G09G 2310/08; G09G 2310/06; G09G 2310/0224; G02F 1/133
See application file for complete search history.

(56) References Cited

U.S. PATENT DOCUMENTS

| | | | |
|---|---|---|---|
| 2005/0068343 A1* | 3/2005 | Pan | G09G 3/3648 345/690 |
| 2006/0017678 A1* | 1/2006 | Shiomi | G09G 3/3648 345/89 |
| 2007/0164946 A1* | 7/2007 | Akutsu | G09G 3/36 345/87 |
| 2007/0252795 A1* | 11/2007 | Shiomi | G09G 3/2048 345/87 |
| 2009/0109135 A1* | 4/2009 | Ooishi | G09G 3/20 345/55 |
| 2009/0278869 A1* | 11/2009 | Oishi | G09G 3/2025 345/691 |
| 2014/0267463 A1* | 9/2014 | Yamakawa | G09G 3/3607 345/690 |

FOREIGN PATENT DOCUMENTS

| | | |
|---|---|---|
| JP | 2004-212610 A | 7/2004 |
| JP | 2004-233949 A | 8/2004 |
| JP | 2005-45470 A | 2/2005 |
| JP | 2009-237352 A | 10/2009 |
| JP | 2009-300785 A | 12/2009 |
| JP | 2010-28472 A | 2/2010 |

* cited by examiner

FIG. 7

OVERSHOOT TABLE 421

| (N-1) FRAME \ N FRAME | 0 | 4 | 8 | 16 | 24 | 32 | 48 | 64 | 80 | 96 | 128 | 160 | 192 | 224 | 240 | 255 |
|---|---|---|---|---|---|---|---|---|---|---|---|---|---|---|---|---|
| 0 | 0 | 15 | 37 | 72 | 89 | 133 | 158 | 175 | 187 | 199 | 218 | 229 | 237 | 245 | 248 | 255 |
| 4 | 0 | 0 | 27 | 54 | 83 | 118 | 144 | 161 | 175 | 191 | 213 | 225 | 235 | 243 | 248 | 250 |
| 8 | 0 | 4 | 8 | 31 | 74 | 100 | 124 | 143 | 159 | 177 | 207 | 223 | 233 | 243 | 250 | 252 |
| 16 | 0 | 2 | 5 | 16 | 38 | 72 | 103 | 123 | 139 | 160 | 200 | 221 | 231 | 243 | 249 | 255 |
| 24 | 0 | 1 | 2 | 6 | 24 | 49 | 86 | 107 | 124 | 148 | 195 | 219 | 231 | 243 | 249 | 255 |
| 32 | 0 | 1 | 1 | 5 | 11 | 32 | 68 | 94 | 112 | 138 | 190 | 217 | 230 | 242 | 249 | 255 |
| 48 | 0 | 0 | 0 | 2 | 5 | 16 | 48 | 76 | 100 | 124 | 181 | 213 | 229 | 241 | 249 | 255 |
| 64 | 0 | 0 | 0 | 2 | 5 | 8 | 35 | 64 | 89 | 116 | 175 | 208 | 227 | 241 | 249 | 255 |
| 80 | 0 | 0 | 0 | 1 | 3 | 6 | 26 | 53 | 80 | 105 | 164 | 201 | 223 | 241 | 249 | 255 |
| 96 | 0 | 0 | 0 | 0 | 3 | 5 | 17 | 41 | 69 | 95 | 150 | 191 | 219 | 238 | 247 | 255 |
| 128 | 0 | 0 | 0 | 0 | 1 | 3 | 7 | 23 | 46 | 75 | 128 | 173 | 209 | 235 | 247 | 255 |
| 160 | 0 | 0 | 0 | 0 | 0 | 1 | 5 | 13 | 31 | 59 | 115 | 160 | 200 | 233 | 245 | 255 |
| 192 | 0 | 0 | 0 | 0 | 0 | 0 | 5 | 7 | 21 | 45 | 102 | 149 | 192 | 229 | 243 | 255 |
| 224 | 0 | 0 | 0 | 0 | 0 | 0 | 3 | 5 | 10 | 30 | 88 | 133 | 180 | 224 | 243 | 255 |
| 240 | 0 | 0 | 0 | 0 | 0 | 0 | 2 | 5 | 7 | 21 | 78 | 122 | 171 | 219 | 240 | 255 |
| 255 | 0 | 0 | 0 | 0 | 0 | 0 | 2 | 3 | 5 | 10 | 59 | 107 | 155 | 210 | 235 | 255 |

RISE PART

DECAY PART

FIG. 9

OVERSHOOT TABLE 422

N FRAME → RISE PART / DECAY PART

| (N-1) FRAME \ N FRAME | 0 | 4 | 8 | 16 | 24 | 32 | 48 | 64 | 80 | 96 | 128 | 160 | 192 | 224 | 240 | 255 |
|---|---|---|---|---|---|---|---|---|---|---|---|---|---|---|---|---|
| 0 | 0 | 15 | 37 | 72 | 89 | 133 | 158 | 175 | 187 | 199 | 218 | 229 | 237 | 245 | 248 | 255 |
| 4 | 0 | 0 | 8 | 54 | 83 | 118 | 144 | 161 | 175 | 191 | 213 | 225 | 235 | 243 | 248 | 248 |
| 8 | 0 | 3 | 8 | 31 | 74 | 100 | 124 | 143 | 159 | 177 | 207 | 223 | 233 | 243 | 249 | 250 |
| 16 | 0 | 3 | 6 | 16 | 38 | 72 | 103 | 123 | 139 | 160 | 200 | 221 | 231 | 243 | 249 | 252 |
| 24 | 0 | 3 | 5 | 11 | 24 | 49 | 86 | 107 | 124 | 148 | 195 | 219 | 231 | 243 | 249 | 255 |
| 32 | 0 | 3 | 5 | 10 | 21 | 32 | 68 | 94 | 112 | 138 | 190 | 217 | 230 | 242 | 249 | 255 |
| 48 | 0 | 2 | 5 | 7 | 16 | 27 | 48 | 76 | 100 | 124 | 181 | 213 | 229 | 241 | 249 | 255 |
| 64 | 0 | 2 | 4 | 6 | 13 | 23 | 45 | 64 | 89 | 116 | 175 | 208 | 227 | 241 | 249 | 255 |
| 80 | 0 | 2 | 3 | 5 | 11 | 21 | 41 | 60 | 80 | 105 | 164 | 201 | 223 | 238 | 249 | 255 |
| 96 | 0 | 2 | 2 | 5 | 9 | 18 | 37 | 56 | 75 | 96 | 150 | 191 | 219 | 235 | 247 | 255 |
| 128 | 0 | 2 | 2 | 5 | 7 | 13 | 30 | 48 | 67 | 89 | 128 | 173 | 209 | 233 | 247 | 255 |
| 160 | 0 | 3 | 3 | 4 | 6 | 10 | 25 | 42 | 59 | 81 | 121 | 160 | 200 | 229 | 245 | 255 |
| 192 | 0 | 3 | 2 | 4 | 6 | 8 | 22 | 37 | 54 | 76 | 115 | 155 | 192 | 224 | 243 | 255 |
| 224 | 1 | 3 | 3 | 4 | 5 | 7 | 17 | 30 | 47 | 68 | 109 | 146 | 180 | 219 | 240 | 255 |
| 240 | 1 | 3 | 3 | 3 | 5 | 7 | 14 | 27 | 42 | 62 | 104 | 141 | 171 | 210 | 235 | 255 |
| 255 | 1 | 4 | 3 | 3 | 5 | 5 | 11 | 22 | 36 | 55 | 98 | 132 | 155 | 210 | 225 | 255 |

LIQUID CRYSTAL DISPLAY APPARATUS AND DISPLAY METHOD

CROSS-REFERENCE TO RELATED APPLICATIONS

This application is the national phase under 35 U.S.C. §371 of PCT International Application No. PCT/JP2014/064871 which has an International filing date of Jun. 4, 2014 and designated the United States of America.

FIELD

The present invention relates to a liquid crystal display apparatus including a liquid crystal panel in which a decay response time is faster than a rise response time upon a gradation transition, and a display method.

BACKGROUND

A display apparatus including a liquid crystal panel needs to change transmittance of a liquid crystal panel when a pixel value (for example, a gradation value, etc.) of an image is changed. Herein, in order to change the transmittance, a desired response time is required. For this reason, when the image is changed, sometimes it is not possible to follow up the change in the transmittance of the liquid crystal panel.

Therefore, a liquid crystal display apparatus, in which each pixel is divided into two or more subpixels, a voltage is applied to one subpixel so as to be overshot, and a voltage is applied to the other subpixel so as to be undershot, thereby a waveform by an overshoot phenomenon and a waveform by a swing-back phenomenon are mutually canceled in the whole pixel, such that quality of display image is maintained, has been disclosed (see Japanese Patent Laid-open Publication No. 2009-237352).

Meanwhile, the liquid crystal display apparatus may display a film image such as a movie film or a video image such as television broadcasts. The movie film, or the like is recorded at 24 frames per second, and has a film frequency of 24 Hz. An image signal of the movie film is converted from 24 Hz into 60 Hz in a main substrate of the liquid crystal display apparatus. The image conversion is referred to as 2-3 pull-down processing, and each frame of the movie film, for example, odd-numbered frames and even-numbered frames are converted into 3 frames and 2 frames, respectively, such that the conversion from 24 Hz into 60 Hz is performed. Further, when a driving frequency (also referred to as a display frequency) of the liquid crystal display apparatus is 60 Hz (normal driving), display image switching (frame switching) is performed at an extremely slow frequency of 3 frames (20 Hz), and 2 frames (30 Hz).

SUMMARY

When an image in which bright parts and dark parts are mixed is displayed on a liquid crystal panel with high definition, for example, a zigzag portion in which light and darkness appears in a zigzag shape is present. For this reason, when such the image is displayed, a transition from the bright part to the dark part and a transition from the dark part to the bright part simultaneously occur at a timing when the frame is switched.

Generally, in the liquid crystal panel, since a decay response time (transition time from a high gradation value to a low gradation value) is faster than a rise response time (transition time from the low gradation value to the high gradation value) upon a gradation transition, brightness of whole zigzag portion is instantaneously reduced. In addition, when the above-described processing of converting the film image into the video image is performed, since the zigzag portion having the reduced brightness occurs at a slow frequency such as 20 Hz, 30 Hz, and the like, the zigzag portion is viewed as a flicker, and thereby causing a problem of a deterioration in display quality.

In consideration of the above-mentioned circumstances, it is an object of the present disclosure to provide a liquid crystal display apparatus capable of suppressing an occurrence of a flicker and preventing a deterioration in display quality, and a display method.

A liquid crystal display apparatus according to the present disclosure including a liquid crystal panel, in which an image in a frame unit at a prescribed display frequency is displayed, and when a frame of the image is switched, a decay response time upon a transition from a high gradation value to a low gradation value is faster than a rise response time upon a transition from the low gradation value to the high gradation value, the liquid crystal display apparatus including an acquisition unit configured to acquire an image of any frame frequency from an outside; a conversion unit configured to insert the frame into one frame of the acquired image acquired by the acquisition unit once or repeatedly plural times and convert the acquired image into an image of the display frequency; and a control unit configured to control so that a first difference is smaller than a second difference, wherein the first difference is a difference between an intermediate value between any high gradation value and low gradation value and a gradation value in which a gradation value during a transition from the high gradation value to the low gradation value is equal to a gradation value during a transition from the low gradation value to the high gradation value, when a frame of the converted image converted by the conversion unit is switched, and the second difference is a difference between the intermediate value between the high gradation value and the low gradation value and the gradation value in which the gradation value during the transition from the high gradation value to the low gradation value is equal to the gradation value during the transition from the low gradation value to the high gradation value, when a frame of the acquired image is switched.

A display method by a liquid crystal display apparatus according to the present disclosure including a liquid crystal panel, in which an image in a frame unit at a prescribed display frequency is displayed, and when a frame of the image is switched, a decay response time upon a transition from a high gradation value to a low gradation value is faster than a rise response time upon a transition from the low gradation value to the high gradation value, the display method including a step of acquiring an image of any frame frequency from an outside, a step of inserting the frame into one frame of the acquired image once or repeatedly plural times and converting the acquired image into an image of the display frequency; and a step of controlling so that a first difference is smaller than a second difference, wherein the first difference is a difference between an intermediate value between any high gradation value and low gradation value and a gradation value in which a gradation value during a transition from the high gradation value to the low gradation value is equal to a gradation value during a transition from the low gradation value to the high gradation value, when a frame of the converted image is switched, and the second difference is a difference between the intermediate value between the high gradation value and the low gradation value and the gradation value in which the gradation value during the transition from the high gradation value to the low gradation value is equal to the gradation value during the transition from the low gradation value to the high gradation value, when the frame of the acquired image is switched.

According to the present disclosure, the acquisition unit acquires the image of any frame frequency from the outside. The image includes a moving image or a picture. The image is, for example, a video image (NTSC signal) having a frame frequency of frames per second, a film image having a frame frequency of 24 frames per second or the like. Further, when interlace scanning is performed at the time of displaying the video image, an image of one frame is scanned twice at a first field and a second field, such that the display frequency corresponds to 60 frames per second.

The conversion unit inserts the frame into the one frame of the acquired image acquired by the acquisition unit once or repeatedly plural times and convert the acquired image into the image of the display frequency. For example, a frame of a film image having a frame frequency of 24 Hz is set to be frame 1, frame 2, frame 3, and frame 4. The conversion unit repeats the frame 1 of the film image three times so that the frame 1 becomes frames 1, 1 and 1, and repeats the frame 2 of the film image twice so that the frame 2 becomes frames 2 and 2. Similarly, the conversion unit repeats the frame 3 of the film image three times so that the frame 3 becomes frames 3, 3 and 3, and repeats the frame 4 of the film image twice so that the frame 4 becomes frames 4 and 4. Thereby, the image converted by the conversion unit becomes the frames 1, 1, 1, 2, 2, 3, 3, 3, 4 and 4, therefore two frames is converted into five frames. As a result, the image having the frame frequency of 24 Hz is converted into an image having a display frequency of 60 Hz. Furthermore, in this case, switching of the frame (for example, such as frames 1 and 2, frames 2 and 3) of the converted image converted by the conversion unit is performed at frequencies of 20 Hz, and 30 Hz.

When the frame of the acquired image acquired by the acquisition unit is switched, a difference between the intermediate value between the high gradation value and the low gradation value and the gradation value in which the gradation value during the transition from the high gradation value to the low gradation value is equal to the gradation value during the transition from the low gradation value to the high gradation value is set to be the second difference. For example, the gradation is set to be 0 to 255, the high gradation value is set to be 240, and the low gradation value is set to be 10. The intermediate value between the high gradation value and the low gradation value becomes 125 {=(240+10)/2}. If a gradation value that the high gradation value and the low gradation value are equal to each other during the transition therebetween is set to be, for example, 40, the second difference becomes 85 (=125−40). When the decay response time and the rise response time are equal to each other upon the gradation transition, the gradation value that the high gradation value and the low gradation value are equal to each other during the transition therebetween is equal to the intermediate value. Since the decay response time is faster than the rise response time upon the gradation transition, the second difference occurs as a reduction in brightness.

When the frame of the converted image converted by the conversion unit is switched, the control unit controls so that the first difference between the intermediate value between the high gradation value and the low gradation value and the gradation value in which the gradation value during the transition from the high gradation value to the low gradation value is equal to the gradation value during the transition from the low gradation value to the high gradation value is smaller than the second difference. For example, the high gradation value is set to be 240 and the low gradation value is to be 10. The intermediate value between the high gradation value and the low gradation value becomes 125 {=(240+10)/2}. If the gradation value that the high gradation value and the low gradation value are equal to each other during the transition therebetween is set to be, for example, 100, the first difference becomes 25 (=125−100), and the first difference may be smaller (<) than the second difference. Thereby, it is possible to suppress a reduction in brightness. Even if the converted image converted by the conversion unit is switched, for example, at a slow frequency such as 20 Hz, 30 Hz, and the like, it is possible to inhibit a reduction in brightness to suppress an occurrence of a flicker, and thereby preventing a deterioration in display quality.

The liquid crystal display apparatus according to the present disclosure, when the frame of the converted image converted by the conversion unit is switched, the control unit controls so as to reduce a difference between the decay response time upon the transition from the high gradation value to the low gradation value and the rise response time upon the transition from the low gradation value to the high gradation value.

According to the present disclosure, when the frame of the converted image converted by the conversion unit is switched, the control unit controls so as to reduce a difference between the decay response time upon the transition from the high gradation value to the low gradation value and the rise response time upon the transition from the low gradation value to the high gradation value. Reducing the difference between the decay response time and the rise response time is to, for example, make a slow the decay response time, make a quick the rise response time, or perform both of them. For example, by making a slow the decay response time, a gradation value in which the gradation value during the transition from the high gradation value to the low gradation value is equal to the gradation value during the transition from the low gradation value to the high gradation value may be set to a higher gradation value, and the first difference which is a difference between the intermediate value may be reduced. Thereby, even if the converted image converted by the conversion unit is switched at the slow frequency such as 20 Hz, 30 Hz, and the like, it is possible to inhibit a reduction in brightness to suppress an occurrence of the flicker, and thereby preventing a deterioration in display quality.

The liquid crystal display apparatus according to the present disclosure, includes a decision unit configured to decide the decay response time and the rise response time upon the gradation transition, in association with each of the gradation values before and after frame switching, wherein, when the frame of the converted image converted by the conversion unit is switched, the control unit controls to increase the decay response time decided by the decision unit, so that the gradation value in which the gradation value during the transition from the high gradation value to the low gradation value is equal to the gradation value during the transition from the low gradation value to the high gradation value approaches the intermediate value.

According to the present disclosure, the decision unit decides the decay response time and the rise response time upon the gradation transition, in association with each of the gradation values before and after frame switching. The decision unit may be configured as a table (for example, referred to as an overshoot table) in association with each of the gradation values before and after frame switching, or may also have a configuration to operate based on each of the gradation values before and after the frame switching. In a case of using the overshoot table, first, when displaying the image acquired by the acquisition unit on the liquid crystal panel without performing the conversion by the conversion unit, for example, the gradation value before the frame switching is set to be 224, and when the gradation value after the frame switching is set to be 80, the overshoot value may be set to be 30.

Next, the acquired image acquired by the acquisition unit is converted by the conversion unit to display on the liquid crystal panel. That is, when the frame of the converted image converted by the conversion unit is switched, the control unit increase the decay response time determined by the decision unit. For example, when the gradation value before the frame switching is set to be 224, and the gradation value after the frame switching is set to be 80, the overshoot value is set to be 47. Briefly, it is possible to increase the decay response time by changing the overshoot value from 30 to 47. Thereby, the control unit controls so that the gradation value in which the gradation value during the transition from the high gradation value (for example, 224) to the low gradation value (for example, 80) is equal to the gradation value during the transition from the low gradation value (for example, 80) to the high gradation value (for example, 224) approaches the intermediate value (for example, 152) between the high gradation value and the low gradation value. Thereby, the first difference is more reduced, and therefore it is possible to suppress a reduction in brightness. In addition, even if the converted image converted by the conversion unit is switched at the slow frequency such as 20 Hz, 30 Hz, and the like, it is possible to inhibit a reduction in brightness to suppress an occurrence of the flicker, and thereby preventing a deterioration in display quality.

The liquid crystal display apparatus according to the present disclosure, wherein the decision unit decides the decay response time, and has a plurality of correction tables each having different correction values in association with the gradation values before and after the frame switching, and when the frame of the converted image converted by the conversion unit is switched, the control unit configured so as to select a correction table in which a difference between the gradation value after the frame switching and the correction value corresponding to the gradation value is small.

According to the present disclosure, the decision unit decides the decay response time, and has the plurality of correction tables each having different correction values in association with the gradation values before and after the frame switching. When the frame of the converted image converted by the conversion unit is switched, the control unit selects the correction table in which the difference between the gradation value after the frame switching and the correction value corresponding to the gradation value is small. The gradation value after the frame switching is a targeted gradation value upon the gradation transition, and if a difference between the correction value and the targeted gradation value is large/small, the decay response time becomes short/long. Therefore, by selecting the overshoot table having a small difference between the gradation value after the frame switching and the correction value corresponding to the gradation value, the decay response time may be increased.

The liquid crystal display apparatus according to the present disclosure, wherein the control unit controls so that a gradation difference between the pixels corresponding to the converted images before and after the frame switching is smaller than a gradation difference between the pixels corresponding to the acquired images before and after the frame switching.

According to the present disclosure, the control unit controls so that the gradation difference between the pixels corresponding to the converted images before and after the frame switching is smaller than the gradation difference between the pixels corresponding to the acquired images before and after the frame switching. For example, when the frame of the acquired image is switched, the gradation value of any pixel of the acquired image is considered to be transited from the high gradation value (for example, 224) to the low gradation value (for example, 80). In this case, the difference between the gradation values of the pixels becomes 144 (=224−80). In addition, the control unit controls so that the gradation value between the pixels corresponding to the converted images before and after the frame (the same frame as the frame of the acquired image) switching is reduced smaller than 144. For example, when the frame (the same frame as the frame of the acquired image) of the converted image is switched, the converted image is generated so that the gradation value of the pixel of the converted image is transited from the high gradation value (for example, 224) to the low gradation value (for example, 152). Thereby, the gradation difference between the pixels of the converted image becomes 92 (=224−152), and thus a sudden change in gradation is avoided to suppress an occurrence of a flicker due to a difference between the decay response time and the rise response time.

The liquid crystal display apparatus according to the present disclosure, includes a generation unit configured to generate an intermediate image including a pixel having an intermediate gradation value between the gradation values of each of the pixels corresponding to the acquired images before and after the frame switching, and when the conversion is performed by the conversion unit, the control unit controls so as to insert the intermediate image generated by the generation unit instead of the one frame of the acquired image before or after the frame switching.

According to the present disclosure, the generation unit generates the intermediate image including the pixel having the intermediate gradation value between the gradation values of each of the pixels corresponding to the acquired image before and after the frame switching. The intermediate gradation value may be, for example, an intermediate value between the high gradation value and the low gradation value of the acquired image, but it is not limited thereto. For example, any pixel of the acquired image is considered to be transited from 224 (high gradation value) to 80 (low gradation value) before and after the frame switching. In this case, the gradation value of the pixel corresponding to the intermediate image may be set to be 152 {=(224+80)/2}. When the conversion is performed by the conversion unit, the control unit controls so as to insert the intermediate image generated by the generation unit instead of the one frame of the acquired image before or after the frame switching. For example, when the conversion is performed by repeating a frame 1 of the acquired image three times, and a frame 2 twice, so as to be frames 1, 1, 1, 2, and 2, an image having an intermediate gradation between the previous frame is inserted into a first frame of the same frame. For example, the conversion is performed so as to be frames 1', 1, 1, 2', and 2. Therefore, the frames 1' and 2' are the intermediate image generated by the generation unit. Thereby, a sudden gradation change is avoided at a timing when the frame is switched, and thus it is possible to suppress an occurrence of the flicker due to a difference between the decay response time and the rise response time.

The liquid crystal display apparatus according to the present disclosure includes a determination unit configured to determine whether the conversion into the converted image is performed by the conversion unit based on the frame frequency and the display frequency, wherein, if it is determined that the conversion into the converted image is performed by the determination unit, the control unit is configured to perform the control.

According to the present disclosure, the determination unit determines whether the conversion into the converted image is performed by the conversion unit based on the frame frequency and the display frequency. For example, when the frame frequency is the display frequency or more, for instance, when the frame frequency is the image (video image) of 60 frames per second, the determination unit determines that the conversion is not performed by the conversion unit. In addition, when the frame frequency is less than the display frequency, for example, when the frame frequency is an image (film image) of 24 frames per second, the determination unit determines that the conversion is performed by the conversion unit. If it is determined that the conversion into the converted image is performed by the determination unit, the control unit performs the control. Thereby, when displaying an image by switching the frame at the frequency that is equal to or faster than the display frequency depending on the image (picture) input from the outside, the display quality is maintained by increasing the response speed of the liquid crystal panel, and when displaying an image by switching the frame at the frequency slower than the display frequency, it is possible to prevent a deterioration in display quality by suppressing an occurrence of the flicker.

According to the present disclosure, it is possible to prevent a deterioration in display quality by suppressing an occurrence of the flicker.

The above and further objects and features of the invention will more fully be apparent from the following detailed description with accompanying drawings.

BRIEF DESCRIPTION OF THE DRAWINGS

FIG. 7 is an explanatory view illustrating one example of an overshoot table used when the image conversion is not performed by the image conversion unit.

FIG. 9 is an explanatory view illustrating one example of a second overshoot table used when the image conversion is performed by the image conversion unit.

DETAILED DESCRIPTION

First Embodiment

Figure 1:
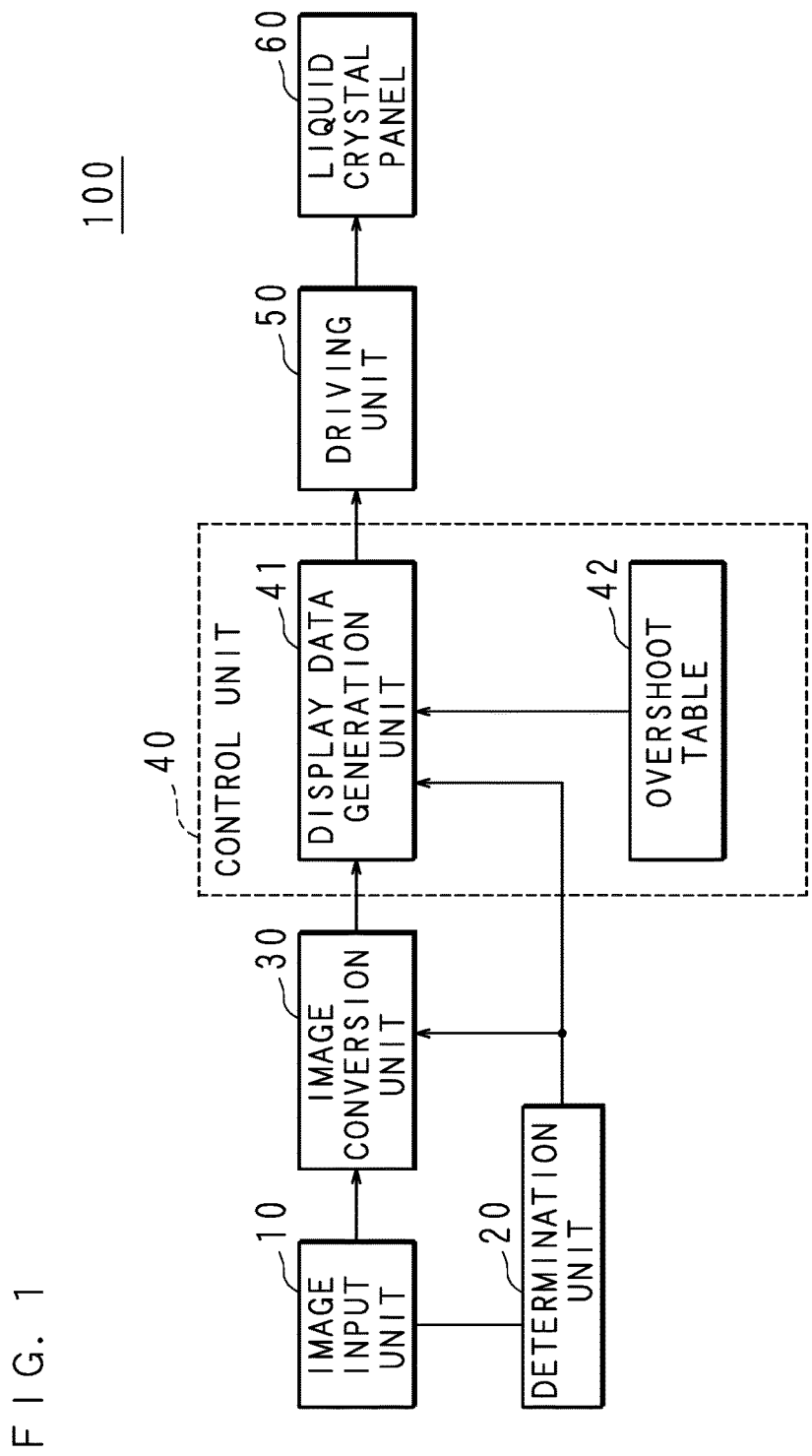
FIG. 1 is a block diagram illustrating one example of a configuration of a liquid crystal display apparatus according to a first embodiment.

Hereinafter, embodiments of the present invention will be described with reference to the accompanying drawings. FIG. 1 is a block diagram illustrating one example of a configuration a liquid crystal display apparatus 100 according to a first embodiment. The liquid crystal display apparatus 100 includes an image input unit 10, a determination unit 20, an image conversion unit 30, a control unit 40, a driving unit, 50, a liquid crystal panel 60 and the like. Further, the control unit 40 includes a display data generation unit 41, an overshoot table 42 and the like. Further, the liquid crystal display apparatus 100 may be, for example, a TV receiving apparatus, an information display apparatus including a touch panel or the like.

The image input unit 10 serves as an acquisition unit to acquire an image of any frame frequency from an outside. The frame frequency is a frequency in a frame unit of the acquired image. The image includes a moving image or a picture. The image is, for example, a video image (NTSC signal) having a frame frequency of 30 frames per second, a film image having a frame frequency of 24 frames per second or the like. Further, when interlace scanning is performed at the time of displaying the video image, an image of one frame is scanned twice at a first field and a second field, such that the display frequency of the video image of this case corresponds to 60 frames per second.

Further, the frame is a unit of an image data (also referred to as picture data) displayed on the liquid crystal panel 60 and an image displayed on the liquid crystal panel 60 at a display frequency is rewritten in a frame unit.

Further, the image input unit 10 has a frame memory (not illustrated) to store the acquired image in the frame unit.

The image conversion unit 30 serves as a conversion unit to insert the frame into one frame of an acquired image acquired by the image input unit 10 once or repeatedly several times, and convert the acquired image into an image of the display frequency.

Figure 2:
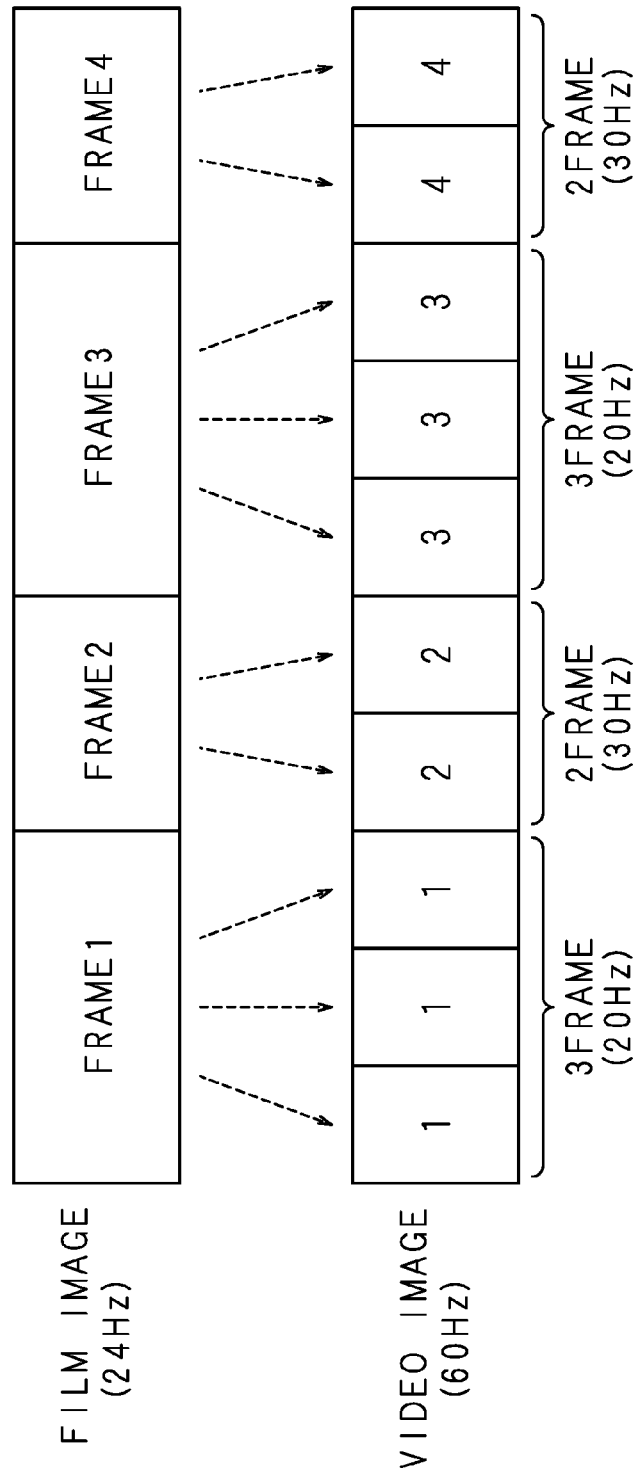
FIG. 2 is a schematic view illustrating one example of image conversion by an image conversion unit.

FIG. 2 is a schematic view illustrating one example of the image conversion by the image conversion unit 30. FIG. 2 illustrates the acquired image acquired by the image input unit 10 at an upper part thereof. Further, FIG. 2 illustrates the converted image converted by the image conversion unit 30 at a lower part thereof. As illustrated in FIG. 2, the acquired image is, for example, a film image having a frame frequency of 24 Hz, and for convenience of explanation, is represented by frame 1, frame 2, frame 3, and frame 4 of four frames.

As illustrated in FIG. 2, the image conversion unit 30 repeats the frame 1 of the film image three times so that the frame 1 becomes frames 1, 1 and 1, and repeats the frame 2 of the film image twice so that the frame 2 becomes frames 2 and 2. Similarly, the conversion unit repeats the frame 3 of the film image three times so that the frame 3 becomes frames 3, 3 and 3, and repeats the frame 4 of the film image twice so that the frame 4 becomes frames 4 and 4. Thereby, the image converted by the image conversion unit 30 becomes the frames 1, 1, 1, 2, 2, 3, 3, 3, 4 and 4, therefore two frames converted into five frames. As a result, the image having the frame frequency of 24 Hz is converted into an image having a display frequency of 60 Hz. Furthermore, in this case, switching of the frame (for example, such as frames 1 and 2, frames 2 and 3) of the converted image converted by the image conversion unit 30 is performed at frequencies of 20 Hz, and 30 Hz.

The determination unit 20 determines whether the conversion of the acquired image into the converted image is performed by the image conversion unit 30, based on the frame frequency and the display frequency. For example, when the frame frequency is the display frequency or more, for instance, when the frame frequency is the image (video image) of 60 frames per second, the determination unit 20 determines that the conversion is not performed by the image conversion unit 30. When the image conversion is not performed, the image conversion unit 30 outputs the image acquired by the image input unit 10 to the display data generation unit 41 as it is.

Further, when the frame frequency is less than the display frequency, for example, when the frame frequency is an image (film image) of 24 frames per second, the determination unit 20 determines that the conversion is performed by the image conversion unit 30. When the image conversion is performed, the image conversion unit 30 converts the image acquired by the image input unit 10 and outputs the converted image to the display data generation unit 41.

The display data generation unit 41 specifies pixel values (for example, gradation values) of each pixel of an image before the frame switching {for example, (N−1) frame}, and pixel values (for example, gradation values) of pixels which are each pixel of an image after the frame switching {for example, N frame}, and correspond to each pixel of the image before the frame switching. For example, if the gradation value of any pixel of the image before the frame switching is set to be 224, and the gradation value of the corresponding pixel of the image after the frame switching is set to be 80, a difference between the gradation values of the pixels becomes 144 (=224−80).

The display data generation unit 41 serves as an overshoot correction to add the overshoot correction to the gradation values of each pixel of the image after the frame switching (N frame) output by the image conversion unit 30 based on the specified difference between the gradation values of each pixel, and thus generate the image (display data of the N frame) after the frame switching (N frame). When the overshoot correction is performed, the display data generation unit 41 uses gradation values within the overshoot table 42.

The overshoot table 42 serves as a decision unit to decide the decay response time and the rise response time upon the gradation transition, in association with the respective gradation values before and after the frame switching. Further, the overshoot table 42 may previously prepare at least two types of tables, and may select a desired table from different types of plurality of overshoot tables 42, based on whether the image conversion is performed by the image conversion unit 30. The overshoot table 42 will be described in detail below.

The display data generation unit 41 outputs the generated image (display data) to the driving unit 50.

The driving unit 50 performs writing scanning of the display data of the frame unit generated by the display data generation unit 41 at vertical display periods (driving periods) of each frame, thereby to drive the liquid crystal panel 60.

The liquid crystal panel 60 has a structure, in which a pair of glass substrates are disposed to face each other and a liquid crystal layer of a liquid crystal material is formed in a gap therebetween, and includes a gate driver connected to gates of each FET in association with each of the plurality of pixels, and a source driver connected to sources of each FET. The liquid crystal panel 60 performs a gradation display of an image in such a way that turn on/off of TFTs of each pixel is controlled by a gate signal input from the gate driver, and light transmittance determined by electro-optical characteristics of the liquid crystal material is controlled depending on a level of voltage input from the source driver in a turn-on period of the FET.

Next, when a high-definition image (picture) is displayed on the liquid crystal panel 60 as a moving image, a case in which a flicker occurs to cause a deterioration in display quality will be described. Further, such the deterioration in the display quality generally occurs, in particular, in a vertical alignment (VA) type liquid crystal panel.

Figure 3:
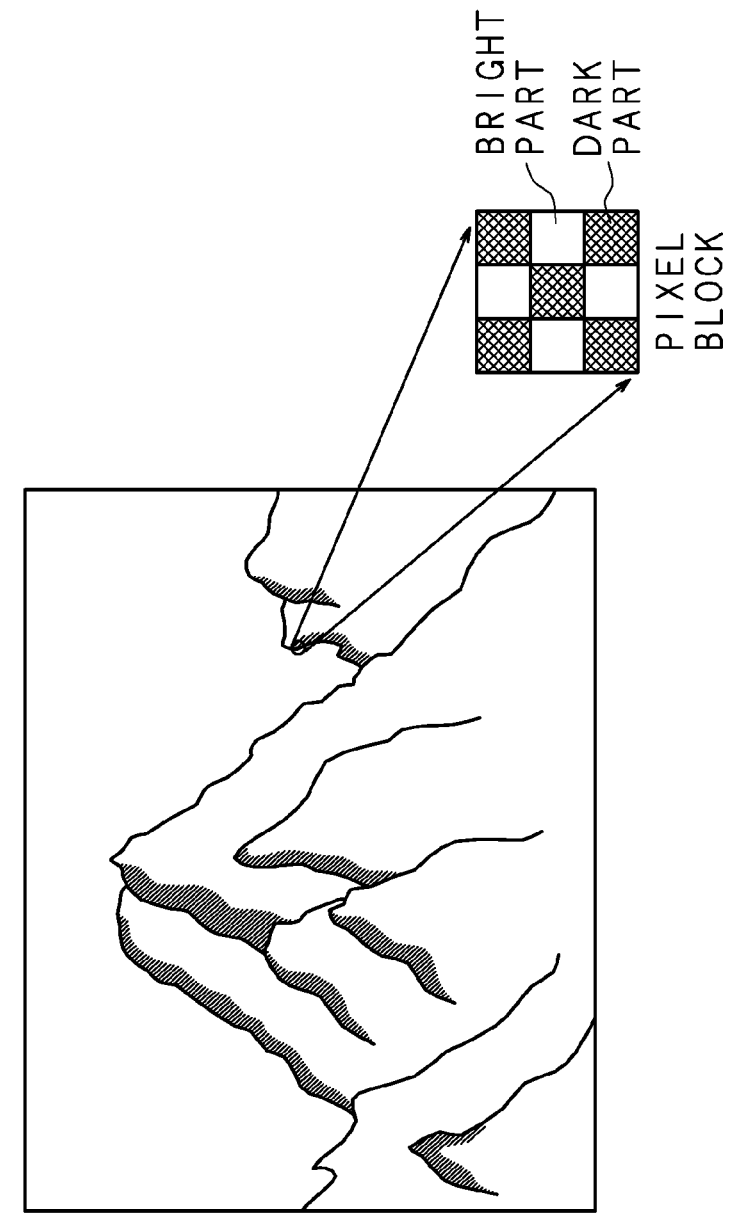
FIG. 3 is a schematic view illustrating one example of a high-definition image.

FIG. 3 is a schematic view illustrating one example of a high-definition image. The example of FIG. 3 illustrates a state in which a part of mountain having a relatively high elevation is covered with snow. In the case of the image (picture), when viewing an area having a small image by extracting, as illustrated in FIG. 3, there is a relatively large zigzag portion in an image, in which bright parts and dark parts are scattered in a zigzag shape. In the example of FIG. 3, for convenience of drawing, a pixel block of 3×3 pixels is extracted as the zigzag portion.

Figure 4:
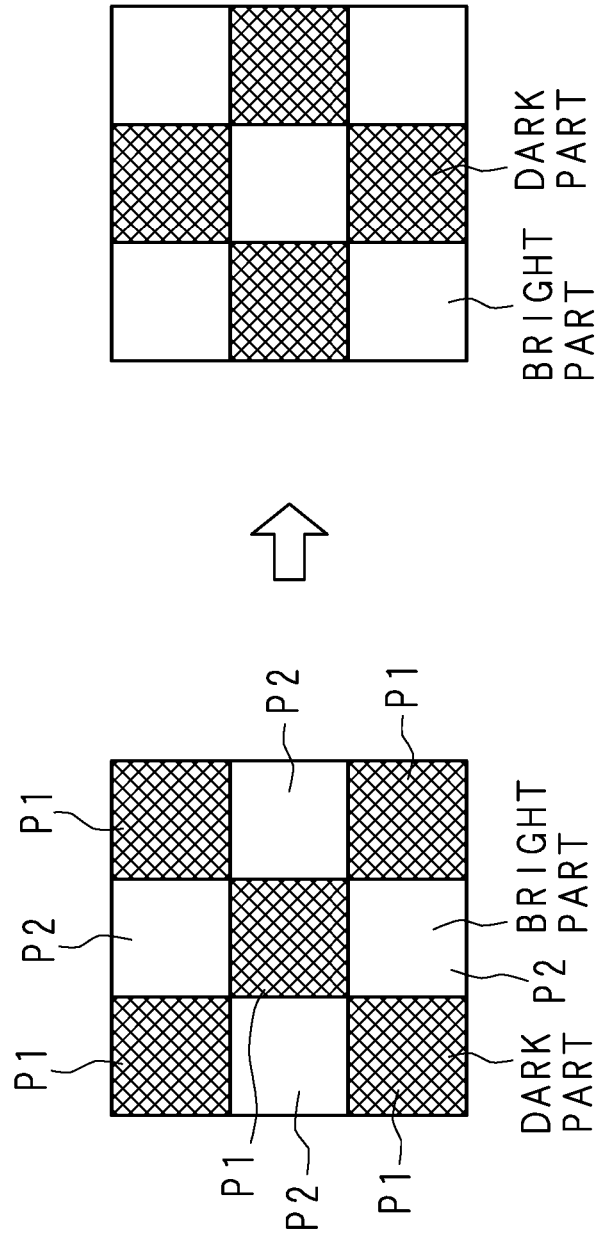
FIG. 4 is an explanatory view illustrating one example of an appearance in which bright parts and dark parts of an image move by a scroll depending on frame switching.

FIG. 4 is an explanatory view illustrating one example of an appearance in which the bright parts and the dark parts of an image move by a scroll depending on the frame switching. The left drawing of FIG. 4 illustrates the image before the frame switching {for example, (N−1) frame} and the right drawing illustrates the image after the frame switching {for example, N frame}. Before the frame switching, a pixel P1 is a dark part and a pixel P2 is a bright part. For the gradation value of the bright part, if the image is scrolled, as illustrated in the right drawing, the pixel P1 is transited from the dark part to the bright part, and the pixel P2 is transited from the bright part to the dark part. Further, for simplification, the respective gradation values (for example, gradation value 10) of the pixel P1 is set to be the same as each other, and the respective gradation values (for example, gradation value 240) of the pixel P2 is also set to be the same as each other. In the image in which the bright parts and the dark parts are mixed with high definition as illustrated in FIG. 3, when the zigzag portions are scrolled, the transition from the bright part to the dark part and the transition from the dark part to the bright part simultaneously occur.

Figure 5:
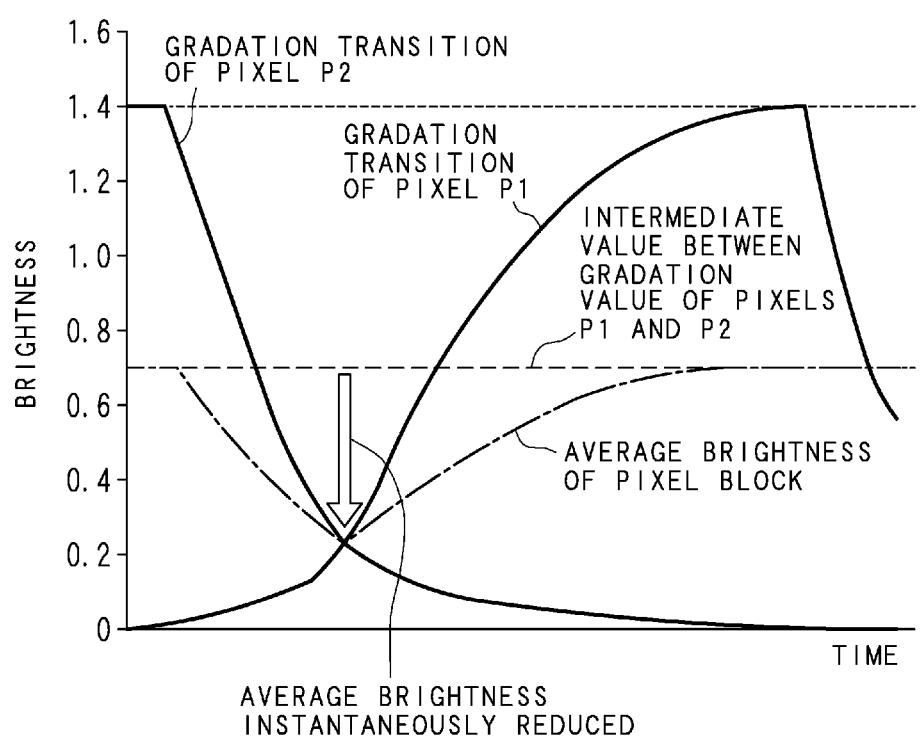
FIG. 5 is a schematic view illustrating one example of a decay response waveform and a rise response waveform upon a gradation transition.

FIG. 5 is a schematic view illustrating one example of the decay response waveform and the rise response waveform upon the gradation transition. FIG. 5 illustrates the response waveform of the gradation transition when the gradation transition exemplified in FIG. 4 is performed. If the frame switching is performed, the pixel P2 considered to be transited from the gradation value 240 (high gradation value) to the gradation value 10 (low gradation value), and the pixel P1 is considered to be transited from the gradation value 10 (low gradation value) to the gradation value 240 (high gradation value).

Generally, in the liquid crystal panel 60, the decay response time is faster than the rise response time upon the gradation transition. In the example of FIG. 5, the gradation transition of the pixel P2 is performed faster than the gradation transition of the pixel P1, such that a gradation value, in which the gradation value during the gradation transition of the pixel P2 and the gradation value during the gradation transition of the pixel P1 are equal to each other, is significantly reduced more than a gradation value 125 $\{=(240+10)/2\}$ that is an intermediate value between the gradation value 240 (high gradation value) and the gradation value 10 (low gradation value) of the pixels P1 and P2 (illustrated by an arrow of FIG. 5). For this reason, average brightness of the zigzag portion (pixel block) including the pixels P1 and P2 is instantaneously reduced upon the frame switching.

Figure 6:
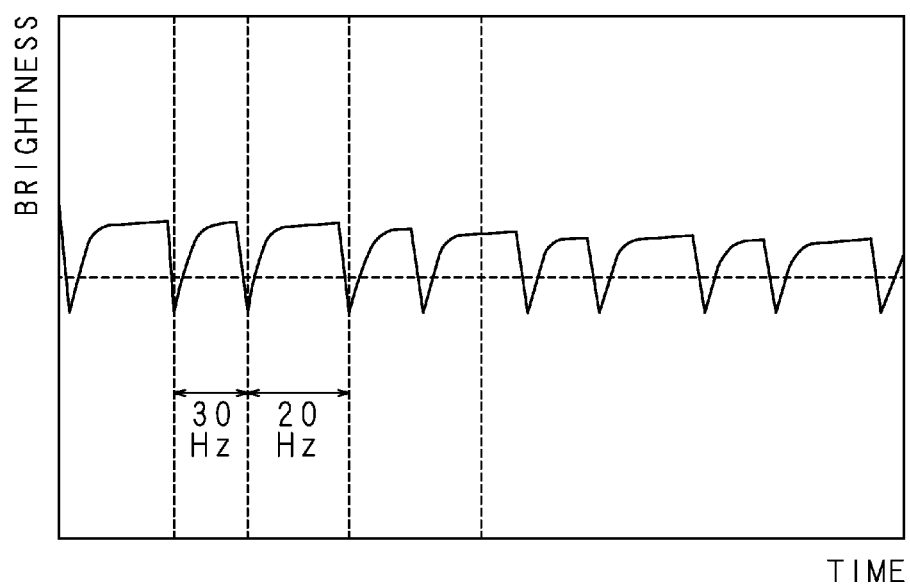
FIG. 6 is a schematic view illustrating one example of an appearance of an occurrence of flicker upon the frame switching.

FIG. 6 is a schematic view illustrating one example of an appearance in which the flicker occurs upon the frame switching. As illustrated in FIG. 2, when the film image (frame frequency of 24 Hz) is converted into the video image having the display frequency of 60 Hz, the frame switching is performed at 20 Hz and 30 Hz. For this reason, an instantaneous reduction in brightness illustrated in FIG. 5 appears at a slow frequency of 20 Hz and 30 Hz. The change in brightness at the frequencies of 20 Hz and 30 Hz may be easily viewed, such that the reduction in an average brightness is viewed as the flicker, which causes a deterioration in display quality.

Next, an overshoot correction by the liquid crystal display apparatus 100 according to the present embodiment will be described. The overshoot table 42 includes at least two tables of a first overshoot table 421 used when the image conversion is not performed by the image conversion unit 30, and a second overshoot table 422 used when the image conversion is performed by the image conversion unit 30.

FIG. 7 is an explanatory view illustrating one example of the first overshoot table 421 used when the image conversion is not performed by the image conversion unit 30. A horizontal field of the table shown in FIG. 7 illustrates the gradation value at the N frame, that is, the gradation value after the frame switching. In addition, a vertical field of FIG. 7 illustrates the gradation value at the (N−1) frame, that is, the gradation value before the frame switching. Further, values within the first overshoot table 421 illustrate overshoot correction values (gradation values) upon the overshoot correction, and an upper right half of the first overshoot table 421 is a rise part in which a transition from the low gradation value to the high gradation value is performed, and a lower left half of the first overshoot table 421 is a decay part in which a transition from the high gradation value to the low gradation value is performed. The overshoot correction value is also referred to as an overshoot parameter.

For example, the liquid crystal panel is set to be able to display gradations from 0 to 255. The gradation value of any pixel of the image having the (N−1) frame is set to be 128, and the gradation value of the pixel corresponding to the image having the N frame is set to be 64. In this case, if the gradation value 64 considered to be written in the liquid crystal panel, since the desired response time is required to change the transmittance of the liquid crystal panel 60, actually when the gradation value of the liquid crystal panel 60 is set to be 80, the gradation value is increased by 16 (=80−64). Therefore, instead of writing the gradation value of 64 in the liquid crystal panel 60, as illustrated in FIG. 7, the overshoot correction (highlight using a gradation value of 23 instead of the gradation value of 64) is performed by writing a gradation value of 23, such that the gradation value of the liquid crystal panel 60 may be set to be about 64.

Similarly, the gradation value of any pixel of the image having the (N−1) frame is set to be 64, and the gradation value of the pixel corresponding to the image having the N frame is set to be 128. In this case, if a gradation value of 128 is considered to be written in the liquid crystal panel, since the desired response time is required to change the transmittance of the liquid crystal panel 60, actually, when the gradation value of the liquid crystal panel 60 is set to be 100, the gradation value is reduced by 28 (=128−100). Therefore, instead of writing the gradation value of 128 in the liquid crystal panel 60, as illustrated in FIG. 7, the overshoot correction (highlight using a gradation value of 175 instead of the gradation value of 128) is performed by writing a gradation value of 175, such that the gradation value of the liquid crystal panel 60 may be set to be about 128.

Next, the reason that the reduction in brightness instantaneously occurs in the case of using the first overshoot table 421 for the converted image converted by the image conversion unit will be described.

Figure 8:
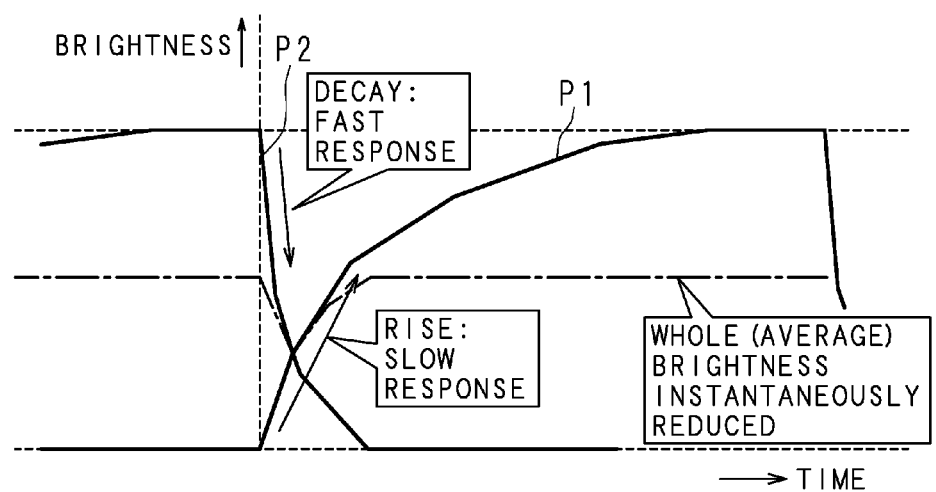
FIG. 8 is a schematic view illustrating one example of the decay response waveform and the rise response waveform upon the gradation transition when a first overshoot table is used for the converted image converted by the image conversion unit.

FIG. 8 is a schematic view illustrating one example of the decay response waveform and the rise response waveform upon the gradation transition when the first overshoot table 421 is used for the converted image converted by the image conversion unit 30. The example of FIG. 8 is the same as the example of FIG. 5. That is, in the example of FIG. 8, the gradation transition of the pixel P2 is performed faster than the gradation transition of the pixel P1, therefore the gradation value, in which the gradation value during the gradation transition of the pixel P2 and the gradation value during the gradation transition of the pixel P1 are equal to each other, is significantly reduced more than the intermediate value between the high gradation value and the low gradation value of the pixels P1 and P2. For this reason, the average brightness (whole brightness) of the zigzag portion (pixel block) including the pixels P1 and P2 is instantaneously reduced upon the frame switching.

Next, a method for suppressing an instantaneous reduction in the above average brightness (whole brightness) will be described.

FIG. 9 is an explanatory view illustrating one example of the second overshoot table 422 used when the image conversion is performed by the image conversion unit 30. A horizontal field of the table shown in FIG. 9 illustrates the gradation value at the N frame, that is, the gradation value after the frame switching. In addition, a vertical field of FIG. 9 illustrates the gradation value at the (N−1) frame, that is, the gradation value before the frame switching. Further, values within the second overshoot table 422 illustrate overshoot correction values (gradation values) upon the overshoot correction, and an upper right half of the second overshoot table 422 is a rise part in which the transition from the low gradation value to the high gradation value is performed, and a lower left half of the second overshoot table 422 is a decay part in which the transition from the high gradation value to the low gradation value is performed.

The second overshoot table will be described compared with the first overshoot table 421 illustrated in FIG. 7. For example, the gradation value of any pixel of the image having the (N−1) frame is set to be 128, and the gradation value of the pixel corresponding to the image having the N frame is set to be 64. In this case, compared with the case in which the overshoot correction value of the first overshoot table 421 illustrated in FIG. 7 is set to be 23, the overshoot correction value of the second overshoot table 422 illustrated in FIG. 9 is set to be 48, and the overshoot correction value is increased by 25 from 23 to 48. Thereby, it is possible to make a slow the decay response time when the transition from the high gradation value to the low gradation value is performed. These are the same as other gradation values.

Further, the overshoot table 42 decides the decay response time, and has the first overshoot table 421 and the second overshoot table 422 as a plurality of correction tables each having different overshoot correction values in association with the gradation values before and after the frame switching. When the frame of the converted image converted by the image conversion unit 30 is switched, the control unit 40 selects the second overshoot table 422 in which a difference between the gradation value after the frame switching and the overshoot correction value corresponding to the gradation value is small.

For example, the gradation value before the frame switching is set to be 128, and the gradation value after the frame switching is set to be 64. In the first overshoot table 421, the overshoot correction values in association with the gradation values before and after the frame switching are set to be 23, and the difference between the gradation value after the frame switching and the overshoot correction value is set to be 41 (=64−23). Meanwhile, in the second overshoot table 422, the overshoot correction values corresponding to the gradation values before and after the frame switching are set to be 48, and the difference between the gradation value after the frame switching and the overshoot correction value is set to be 16 (=64−48).

The gradation value after the frame switching is a targeted gradation value upon the gradation transition, and if a difference between the correction value and the targeted gradation value is large/small, the decay response time becomes short/long. Therefore, by selecting the overshoot table having a small difference between the gradation value after the frame switching and the correction value corresponding to the gradation value, the decay response time may be increased.

The second overshoot table 422 sets the overshoot correction value so that the rise response waveform and the decay response waveform of the liquid crystal are almost line symmetrical to each other. That is, the overshoot correction value is set so that the rise and decay response waveforms approach each other (in other words, to make the transit time to the targeted gradation equal) at the time of transition to the targeted gradation. Generally, the overshoot correction value to improve the display quality of the moving image by increasing a response speed of the liquid crystal is set so that the response time is shortest within a range in which the liquid crystal does not exceed the targeted transmittance, like the first overshoot table 421. However, in the present embodiment, the response speed (arrival speed to the targeted gradation) as well as, like the second overshoot table 422, the response waveform itself between different two targeted gradation values are set to be almost line symmetrical to each other at rise and decay parts. Thereby, it is possible to suppress an occurrence of the flicker when the transition from the bright part to the dark part and the transition from the dark part to the bright part simultaneously occur. In detail, it may be achieved by suppressing a higher response speed by comparing the rise response waveform with the decay response waveform, and finely adjusting a brightness achievement degree during a transition of liquid crystal molecules.

Further, in FIGS. 7 and 9, the gradation value at the N frame and the gradation value at the (N−1) frame are displayed by discrete values, but the overshoot correction value for the gradation value which is not displayed may be calculated by means of processing such as a linear interpolation using the displayed gradation value.

Figure 10:
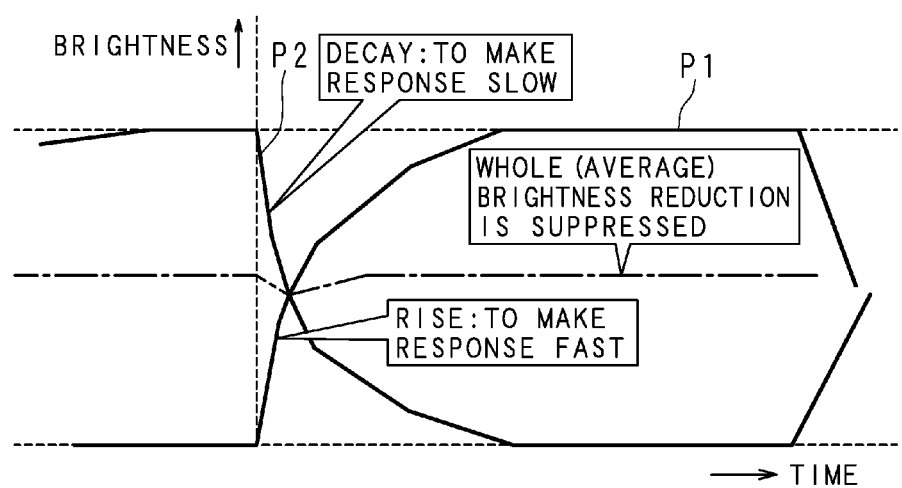
FIG. 10 is a schematic view illustrating one example of the decay response waveform and the rise response waveform upon the gradation transition when a second overshoot table is used for the converted image converted by the image conversion unit.

FIG. 10 is a schematic view illustrating one example of the rise response waveform and the decay response waveform upon the gradation transition when the second overshoot table 422 is used for the converted image converted by the image conversion unit 30. In the example of FIG. 10, by making a slow the decay response time according to the gradation transition of the pixel P2, the gradation value, in which the gradation value during the gradation transition of the pixel P2 and the gradation value during the gradation transition of the pixel P1 are equal to each other, approaches the intermediate value between the high gradation value and the low gradation value of the pixels P1 and P2, compared with the case of FIG. 8. For this reason, the reduction in the average brightness (whole brightness) of the zigzag portion (pixel block) including the pixels P1 and P2 is suppressed.

Further, it may be adjusted so as to make a slow only the decay response time, or make a quick only the rise response time, and alternately, it may also be adjusted so as to make a slow only the decay response time and make a quick the rise response time.

In the liquid crystal display apparatus 100 of the present embodiment, when the frame of the acquired image acquired by the image input unit 10 is switched, the control unit 40 specifies a difference between the intermediate value between the high gradation value and the low gradation value and the gradation value in which the gradation value during the transition from the high gradation value to the low gradation value is equal to the gradation value during the transition from the low gradation value to the high gradation value as a second difference. For example, the gradation of the liquid crystal panel 60 is set to be 0 to 255, the high gradation value is set to be 240, and the low gradation value is set to be 10. The intermediate value between the high gradation value and the low gradation value becomes 125 {=(240+10)/2}. If a gradation value that the high gradation value and the low gradation value are equal to each other during the transition therebetween is set to be, for example, 40, the second difference becomes 85 (=125−40). When the decay response time and the rise response time are equal to each other upon the gradation transition, the gradation value that the high gradation value and the low gradation value are equal to each other during the transition therebetween is equal to the intermediate value. Since the decay response time is faster than the rise response time upon the gradation transition, the second difference occurs as a reduction in brightness.

Further, when the frame of the converted image converted by the image conversion unit 30 is switched, the control unit 40 specifies a first difference between the intermediate value between the high gradation value and the low gradation value and the gradation value in which the gradation value during the transition from the high gradation value to the low gradation value is equal to the gradation value during the transition from the low gradation value to the high gradation value.

In addition, the control unit 40 controls so that the specified first difference is smaller than the second difference. For example, the high gradation value is set to be 240, and the low gradation value is to be 10. The intermediate value between the high gradation value and the low gradation value becomes 125 {=(240+10)/2}. If the gradation value that the high gradation value and the low gradation value are equal to each other during the transition therebetween is controlled to be, for example, 100, the first difference becomes 25 (=125−100), and the first difference may be smaller (<) than the second difference. Thereby, it is possible to suppress a reduction in brightness. Even if the converted image converted by the image conversion unit 30 is switched, for example, at the slow frequency such as 20 Hz, 30 Hz, and the like, it is possible to inhibit a reduction in brightness to suppress an occurrence of the flicker, and thereby preventing a deterioration in display quality.

Further, in the liquid crystal display apparatus 100 of the present embodiment, when the frame of the converted image converted by the image conversion unit 30 is switched, the control unit 40 controls so as to reduce a difference between the decay response time upon the transition from the high gradation value to the low gradation value and the rise response time upon the transition from the low gradation value to the high gradation value. Reducing the difference between the decay response time and the rise response time is to, for example, make a slow the decay response time, make a quick the rise response time, or perform both of them. For example, by making a slow the decay response time, a gradation value in which the gradation value during the transition from the high gradation value to the low gradation value is equal to the gradation value during the transition from the low gradation value to the high gradation value may be set to a higher gradation value, and the first difference which is a difference between the intermediate value may be reduced. Thereby, even if the converted image converted by the image conversion unit 30 is switched at the slow frequency such as 20 Hz, 30 Hz, and the like, it is possible to inhibit a reduction in brightness to suppress an occurrence of the flicker, and thereby preventing a deterioration in display quality.

Further, in the liquid crystal display apparatus 100 of the present embodiment, when the frame of the converted image converted by the image conversion unit 30 is switched, the control unit 40 controls to increase a decay response time determined by the second overshoot table 422. For example, in FIG. 9, when the gradation value before the frame switching is set to be 224, and the gradation value after the frame switching is set to be 80, the overshoot value is set to be 47. Briefly, compared with the example of FIG. 7, it is possible to increase the decay response time by changing the overshoot value from 30 to 47.

Thereby, the control unit 40 controls so that the gradation value in which the gradation value during the transition from the high gradation value (for example, 224) to the low gradation value (for example, 80) is equal to the gradation value during the transition from the low gradation value (for example, 80) to the high gradation value (for example, 224) approaches the intermediate value (for example, 152) between the high gradation value and the low gradation value. Thereby, the first difference is more reduced, and therefore it is possible to suppress a reduction in brightness. In addition, even if the converted image converted by the image conversion unit 30 is switched at the slow frequency such as 20 Hz, 30 Hz, and the like, it is possible to inhibit a reduction in brightness to suppress an occurrence of the flicker, and thereby preventing a deterioration in display quality.

Further, in the liquid crystal display apparatus 100 of the present embodiment, if it is determined that the conversion into the converted image is performed by the determination unit 20, the control unit 40 performs the control as illustrated in the example of FIG. 9. Thereby, when displaying an image by switching the frame at the frequency that is equal to or faster than the display frequency depending on the image (picture) input from the outside, the display quality is maintained by increasing the response speed of the liquid crystal panel, and when displaying an image by switching the frame at the frequency slower than the display frequency, it is possible to prevent a deterioration in display quality by suppressing an occurrence of the flicker.

Second Embodiment

The first embodiment has a configuration of using the overshoot table 42, but it is not limited thereto. A second embodiment includes an operation unit (not illustrated) instead of the overshoot table 42. The operation unit may operate the overshoot correction value based on each of the gradation values before and after the frame switching. Further, other components of the present embodiment are the same as those of the first embodiment, therefore will not be described.

Third Embodiment

Figure 11:
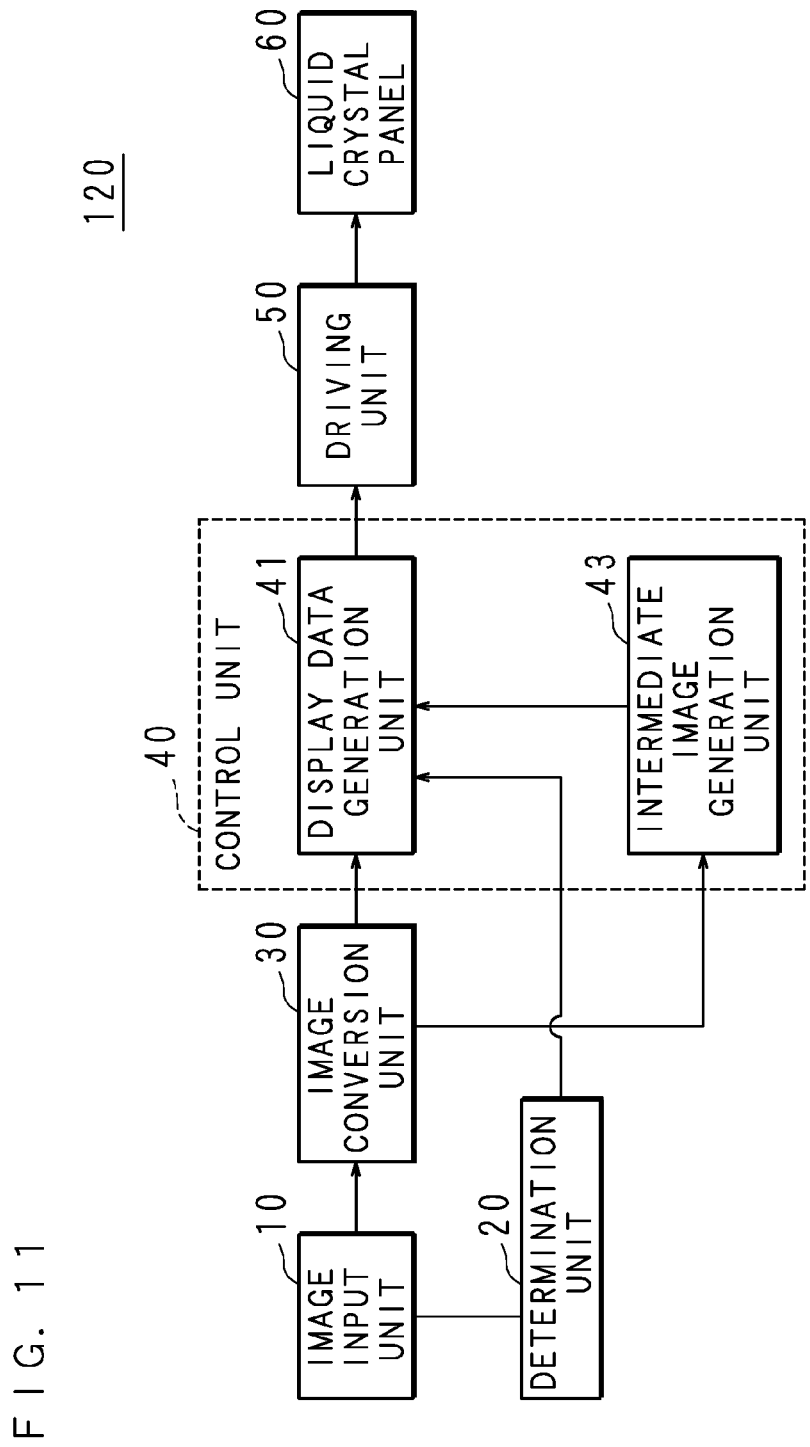
FIG. 11 is a block diagram illustrating one example of a configuration a liquid crystal display apparatus according to a third embodiment.

FIG. 11 is a block diagram of one example of a configuration of a liquid crystal display apparatus 120 according to a third embodiment. The third embodiment is different from the first embodiment in an aspect of including an intermediate image generation unit 43 instead of the overshoot table 42 thereof.

The intermediate image generation unit 43 serves as a generation unit to generate an intermediate image including a pixel having an intermediate gradation value between the gradation values of each of the pixels corresponding to the acquired image before and after the frame switching. The intermediate gradation value may be, for example, an intermediate value between the high gradation value and the low gradation value of the acquired image, but it is not limited thereto. For example, any pixel of the acquired image considered to be transited from 224 (high gradation value) to 80 (low gradation value) before and after the frame switching. In this case, the gradation value of the pixel corresponding to the intermediate image may be set to be 152 {=(224+80)/2}.

When the acquired image is converted by the image conversion unit 30, the control unit 40 controls so as to insert the intermediate image generated by the intermediate image generation unit 43 instead of one frame of the acquired image before or after the frame switching.

Figure 12:
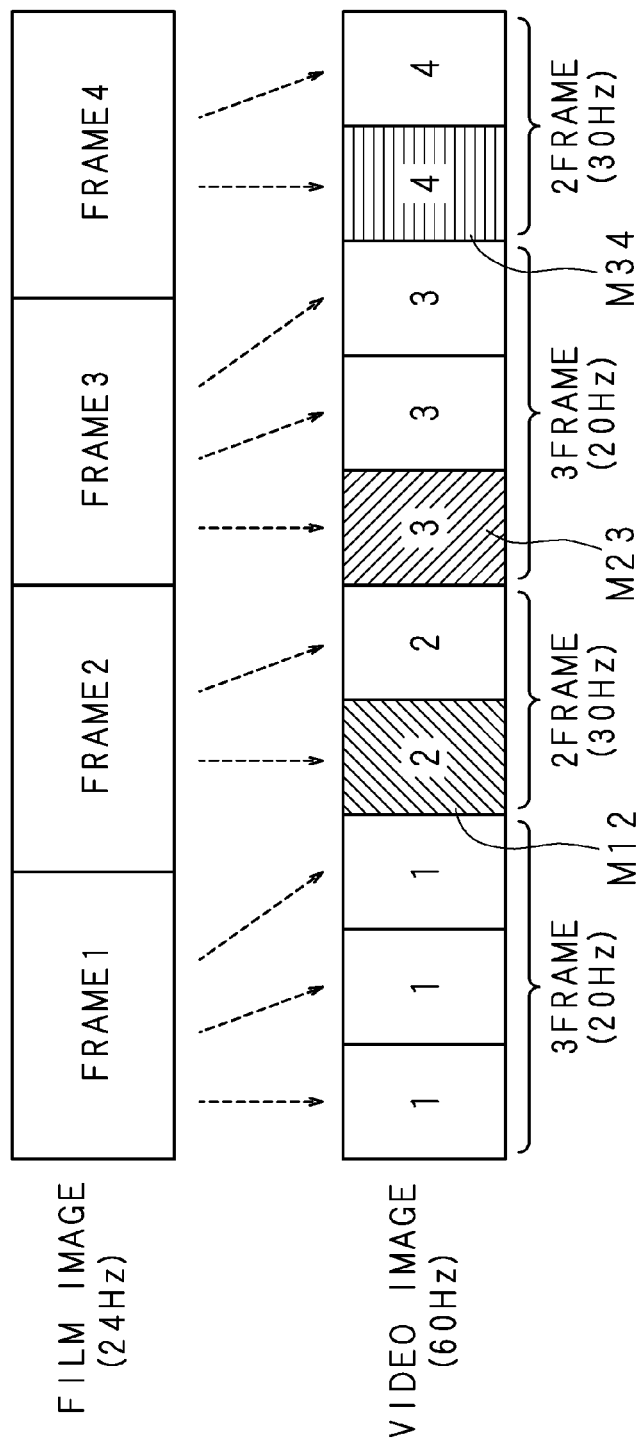
FIG. 12 is a schematic view illustrating one example of suppressing an occurrence of a flicker by the liquid crystal display apparatus according to the third embodiment.

FIG. 12 is a schematic view illustrating one example of suppressing an occurrence of a flicker by the liquid crystal display apparatus 120 according to the third embodiment. As illustrated in FIG. 12, the acquired image considered to be converted by repeating a frame 1 of the acquired image (film image) three times, a frame 2 twice, a frame 3 three times, and a frame 4 twice. In this case, an image having an intermediate gradation between the previous frame, that is, the intermediate image generated by the intermediate image generation unit 43 is inserted into a first frame of the same frame. An intermediate image corresponding to the frame 1 and the frame 2 is represented by frame M12, an intermediate image corresponding to the frame 2 and the frame 3 is represented by frame M23, and an intermediate image corresponding to the frame 3 and the frame 4 is represented by frame 34. In this case, the converted image converted by the image conversion unit 30 becomes frames 1, 1, 1, M12, 2, M23, 3, 3, M34, and 4. Thereby, a sudden gradation change is avoided at a timing when the frame is switched, and thus it is possible to suppress an occurrence of the flicker due to a difference between the decay response time and the rise response time.

Figure 13:
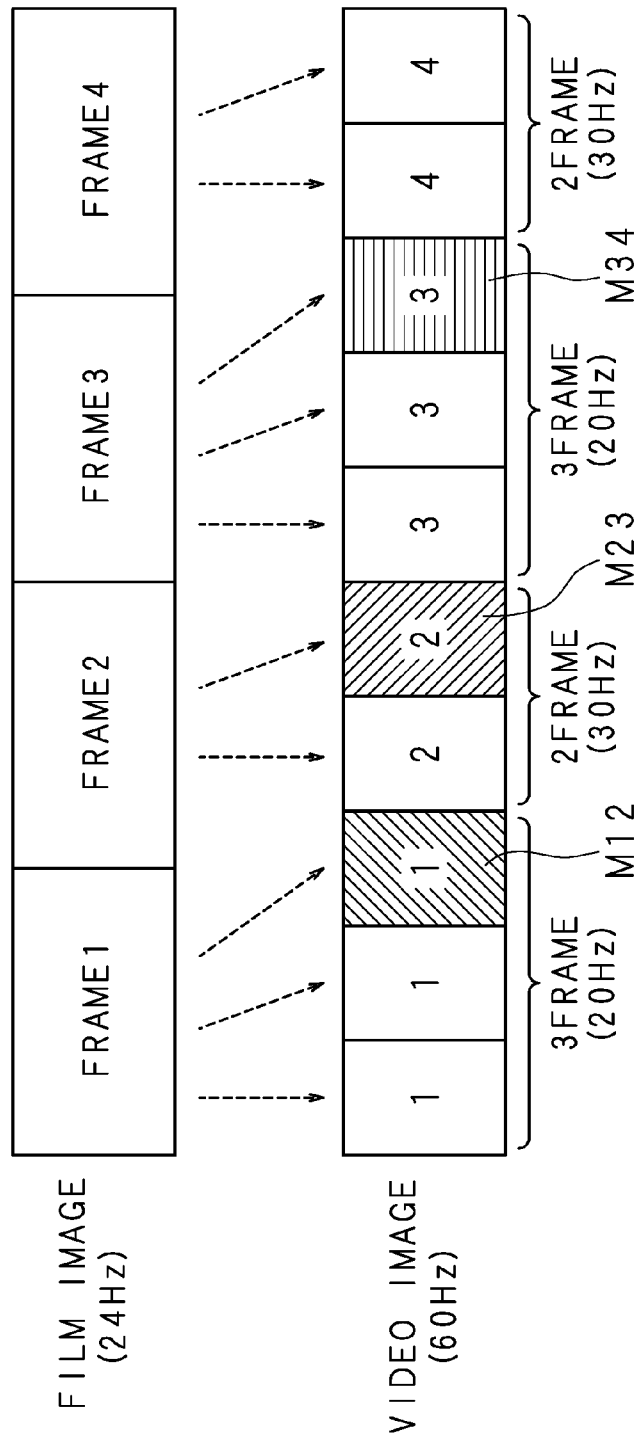
FIG. 13 is a schematic view illustrating another example of suppressing an occurrence of a flicker by the liquid crystal display apparatus according to the third embodiment.

FIG. 13 is a schematic view illustrating another example of suppressing an occurrence of a flicker by the liquid crystal display apparatus 120 according to the third embodiment. As illustrated in FIG. 13, the acquired image considered to be converted by repeating a frame 1 of the acquired image (film image) three times, a frame 2 twice, a frame 3 three times, and a frame 4 twice. In this case, the image having an intermediate gradation between the next frame, that is, the intermediate image generated by the intermediate image generation unit 43 is inserted into a last frame of the same frame. An intermediate image corresponding to the frame 1 and the frame 2 is represented by frame M12, an intermediate image corresponding to the frame 2 and the frame 3 is represented by frame M23, and an intermediate image corresponding to the frame 3 and the frame 4 is represented by frame 34. In this case, the converted image converted by the image conversion unit 30 becomes frames 1, 1, M 12, 2, M23, 3, 3, M34, 4 and 4. Thereby, a sudden gradation change is avoided at a timing when the frame is switched, and thus it is possible to suppress an occurrence of the flicker due to a difference between the decay response time and the rise response time.

Further, in the liquid crystal display apparatus 120 according to the third embodiment, the control unit 40 controls so that the gradation difference between the pixels corresponding to the converted images before and after the frame switching is smaller than the gradation difference between the pixels corresponding to the acquired images before and after the frame switching. For example, when the frame of the acquired image is switched, the gradation value of any pixel of the acquired image is considered to be transited from the high gradation value (for example, 224) to the low gradation value (for example, 80). In this case, the difference between the gradation values of the pixels becomes 144 (=224−80). In addition, the control unit 40 controls so that the gradation value between the pixels corresponding to the converted images before and after the frame (the same frame as the frame of the acquired image) switching is reduced smaller than 144. For example, when the frame (the same frame as the frame of the acquired image) of the converted image is switched, the converted image is generated so that the gradation value of the pixel of the converted image is transited from the high gradation value (for example, 224) to the low gradation value (for example, 152). Thereby, the gradation difference between the pixels of the converted image becomes 92 (=224−152), and thus the sudden change in gradation is avoided to suppress an occurrence of the flicker due to a difference between the decay response time and the rise response time.

Fourth Embodiment

Figure 14:
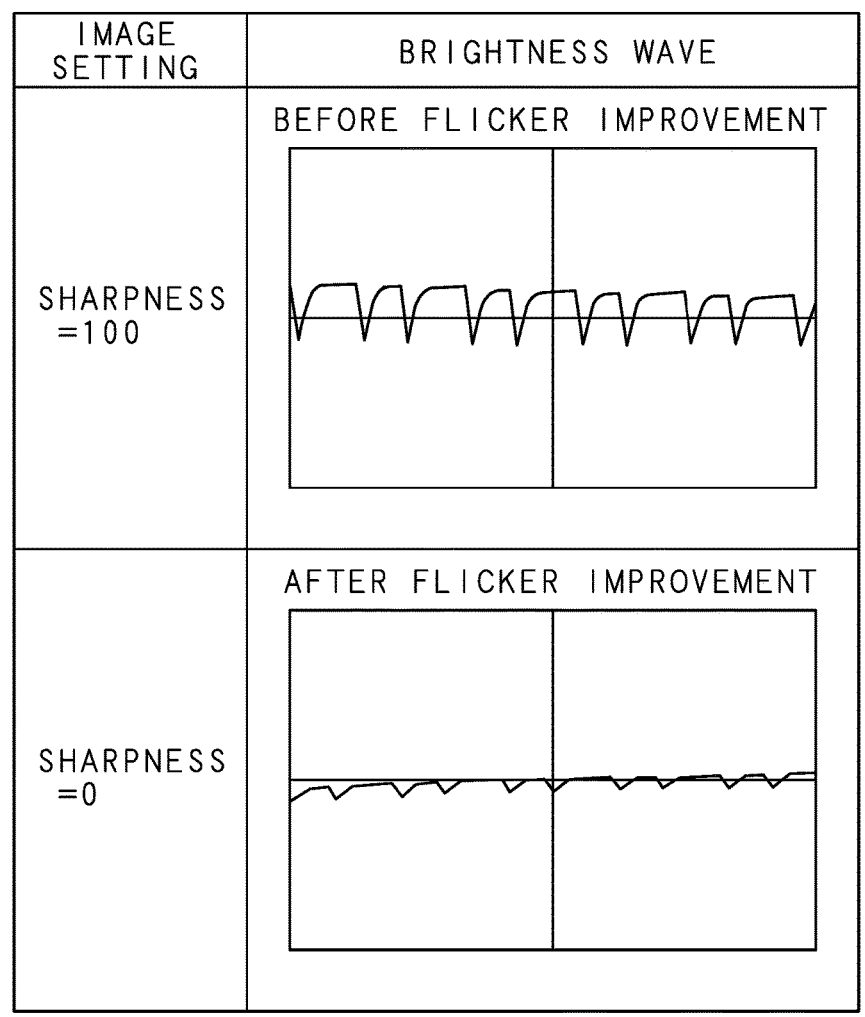
FIG. 14 is an explanatory view illustrating one example of a method for improving a flicker according to a fourth embodiment.

FIG. 14 is an explanatory view illustrating one example of a method for improving a flicker according to a fourth embodiment. As illustrated in FIG. 14, in the fourth embodiment, for example, the control unit 40 adjusts a sharpness value as image setting.

More specifically, if it is determined that the conversion into the converted image is performed by the determination unit 20, the control unit 40 adjusts the sharpness to, for example, 0, thus to reduce the difference between the gradation values of neighbor pixels, and thereby suppressing an occurrence of the flicker. Thereby, it is possible to improve the flicker.

Meanwhile, if it is determined that the conversion into the converted image is not performed by the determination unit 20, the control unit 40 adjusts the sharpness to, for example, 100, thus to maintain the sharpness of the acquired image, and thereby it is possible to display a sharp image. If it is determined that the conversion into the converted image is not performed by the determination unit 20, even if the flicker occurs, the flicker does not appear at a slow frequency such as 20 Hz, 30 Hz and the like, but appears at a frequency of 60 Hz, and therefore it is difficult for a user to observe the flicker. Therefore, it is possible to maintain the display quality of the image by preferentially considering the sharpness of the image over the improvement in flicker.

As this description may be embodied in several forms without departing from the spirit of essential characteristics thereof, the above-described embodiments are therefore illustrative and not restrictive. Since the scope is defined by the appended claims rather than by the description preceding them, and all changes that fall within metes and bounds of the claims, or equivalence of such metes and bounds thereof are therefore intended to be embraced by the claims.

It is to be noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A liquid crystal display apparatus including a liquid crystal panel, in which an image in a frame unit at a prescribed display frequency is displayed, and when a frame of the image is switched, a decay response time upon a transition from a high gradation value to a low gradation value is faster than a rise response time upon a transition from the low gradation value to the high gradation value, the liquid crystal display apparatus comprising:

an acquisition unit configured to acquire an image of any frame frequency from an outside;

a conversion unit configured to insert the frame into one frame of the acquired image acquired by the acquisition unit once or repeatedly plural times and convert the acquired image into an image of the display frequency; and a control unit configured to control so that a first difference is smaller than a second difference, wherein the first difference is a difference between an intermediate value between any high gradation value and low gradation value and a gradation value in which a gradation value during a transition from the high gradation value to the low gradation value is equal to a gradation value during a transition from the low gradation value to the high gradation value, when a frame of the converted image converted by the conversion unit is switched, and the second difference is a difference between the intermediate value between the high gradation value and the low gradation value and the gradation value in which the gradation value during the transition from the high gradation value to the low gradation value is equal to the gradation value during the transition from the low gradation value to the high gradation value, when a frame of the acquired image is switched.

2. The liquid crystal display apparatus of claim 1, wherein, when the frame of the converted image converted by the conversion unit is switched, the control unit controls so as to reduce a difference between the decay response time upon the transition from the high gradation value to the low gradation value and the rise response time upon the transition from the low gradation value to the high gradation value.

3. The liquid crystal display apparatus of claim 1, comprising:
a decision unit configured to decide the decay response time and the rise response time upon the gradation transition, in association with each of the gradation values before and after frame switching,
wherein, when the frame of the converted image converted by the conversion unit is switched, the control unit controls to increase the decay response time decided by the decision unit, so that the gradation value in which the gradation value during the transition from the high gradation value to the low gradation value is equal to the gradation value during the transition from the low gradation value to the high gradation value approaches the intermediate value.

4. The liquid crystal display apparatus of claim 3, wherein the decision unit decides the decay response time, and has a plurality of correction tables each having different correction values in association with the gradation values before and after the frame switching, and
when the frame of the converted image converted by the conversion unit is switched, the control unit configured so as to select a correction table in which a difference between the gradation value after the frame switching and the correction value corresponding to the gradation value is small.

5. The liquid crystal display apparatus of claim 1, wherein the control unit controls so that a gradation difference between the pixels corresponding to the converted images before and after the frame switching is smaller than a gradation difference between the pixels corresponding to the acquired images before and after the frame switching.

6. The liquid crystal display apparatus of claim 5, comprising:
a generation unit configured to generate an intermediate image including a pixel having an intermediate gradation value between the gradation values of each of the pixels corresponding to the acquired images before and after the frame switching, and
when the conversion is performed by the conversion unit, the control unit controls so as to insert the intermediate image generated by the generation unit instead of the one frame of the acquired image before or after the frame switching.

7. The liquid crystal display apparatus of claim 1, comprising:
a determination unit configured to determine whether the conversion into the converted image is performed by the conversion unit based on the frame frequency and the display frequency,
wherein, if it is determined that the conversion into the converted image is performed by the determination unit, the control unit is configured to perform the control.

8. A display method by a liquid crystal display apparatus including a liquid crystal panel, in which an image in a frame unit at a prescribed display frequency is displayed, and when a frame of the image is switched, a decay response time upon a transition from a high gradation value to a low gradation value is faster than a rise response time upon a transition from the low gradation value to the high gradation value, the display method comprising:
a step of acquiring an image of any frame frequency from an outside;
a step of inserting the frame into one frame of the acquired image once or repeatedly plural times and converting the acquired image into an image of the display frequency; and
a step of controlling so that a first difference is smaller than a second difference, wherein
the first difference is a difference between an intermediate value between any high gradation value and low gradation value and a gradation value in which a gradation value during a transition from the high gradation value to the low gradation value is equal to a gradation value during a transition from the low gradation value to the high gradation value, when a frame of the converted image is switched, and the second difference is a difference between the intermediate value between the high gradation value and the low gradation value and the gradation value in which the gradation value during the transition from the high gradation value to the low gradation value is equal to the gradation value during the transition from the low gradation value to the high gradation value, when the frame of the acquired image is switched.

* * * * *